(12) United States Patent
Shi et al.

(10) Patent No.: US 10,116,506 B2
(45) Date of Patent: Oct. 30, 2018

(54) METHOD FOR UPGRADING VERSION OF NETWORK DEVICE AND NETWORK DEVICE

(71) Applicant: Huawei Technologies Co., Ltd., Shenzhen (CN)

(72) Inventors: Wenjiang Shi, Beijing (CN); Fei Liu, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 271 days.

(21) Appl. No.: 15/153,590

(22) Filed: May 12, 2016

(65) Prior Publication Data

US 2016/0261460 A1 Sep. 8, 2016

Related U.S. Application Data

(63) Continuation of application No. PCT/CN2013/087116, filed on Nov. 14, 2013.

(51) Int. Cl.
*H04L 12/26* (2006.01)
*H04L 12/24* (2006.01)
(Continued)

(52) U.S. Cl.
CPC ............ *H04L 41/082* (2013.01); *H04L 47/12* (2013.01); *H04L 61/6022* (2013.01); *H04L 65/4076* (2013.01); *H04L 69/324* (2013.01)

(58) Field of Classification Search
CPC ..... H04L 41/08; H04L 41/082; H04L 41/084; H04L 41/0846; H04L 41/0889; H04L 45/563
(Continued)

(56) References Cited

U.S. PATENT DOCUMENTS 5,920,699 A * 7/1999 Bare ................. H04L 12/1886
709/225
7,363,387 B1 * 4/2008 Chandra ................. H04L 12/66
709/220
(Continued)

FOREIGN PATENT DOCUMENTS

CN 1710864 A 12/2005
CN 1987787 A 6/2007
(Continued)

OTHER PUBLICATIONS

Zhang et al.: "Design of ISSU System for Devices in Distrubuted Network," Jun. 19, 2010, 4 pages, China.

*Primary Examiner* — Dmitry H Levitan
(74) *Attorney, Agent, or Firm* — Slater Matsil, LLP

(57) ABSTRACT

Embodiments of the present invention disclose a method for upgrading a version of a network device and a device. A specific solution is: configuring a forwarding plane of the network device to be a first forwarding plane and a second forwarding plane; performing, in the first forwarding plane, sampling on forwarded packets by using a preset sampling ratio, to obtain a sample packet; forwarding, by the second forwarding plane, the sample packet in a broadcast manner, to learn a MAC address; and when a quantity of MAC addresses learned by the second forwarding plane reaches a preset threshold, performing upgrade so that the second forwarding plane is used for packet forwarding of the network device. The technical solution can effectively avoid generation of a large quantity of broadcast packets during a version upgrade process, can help reduce network bandwidth that is excessively occupied, and avoid network congestion.

15 Claims, 5 Drawing Sheets

(51) Int. Cl.
*H04L 12/801* (2013.01)
*H04L 29/12* (2006.01)
*H04L 29/06* (2006.01)
*H04L 29/08* (2006.01)

(58) Field of Classification Search
USPC ........ 370/216, 218, 254, 270; 717/168, 171; 709/223, 238, 242
See application file for complete search history.

(56) References Cited

U.S. PATENT DOCUMENTS

| | | | |
|---|---|---|---|
| 7,391,730 B1* | 6/2008 | Chandra | H04L 45/021 370/236 |
| 7,415,706 B1 | 8/2008 | Raju et al. | |
| 8,364,843 B2* | 1/2013 | Hanselmann | H04L 45/22 709/242 |
| 8,943,489 B1* | 1/2015 | Qu | G06F 8/656 717/168 |
| 9,338,055 B2* | 5/2016 | Choorakkot Edakkunni | H04L 41/082 |
| 2002/0001307 A1 | 1/2002 | Nguyen et al. | |
| 2007/0162565 A1 | 7/2007 | Hanselmann | |
| 2007/0258490 A1 | 11/2007 | Wellum et al. | |
| 2013/0009216 A1 | 1/2013 | Tsai et al. | |
| 2014/0025826 A1 | 1/2014 | Xia et al. | |

FOREIGN PATENT DOCUMENTS

| | | |
|---|---|---|
| CN | 101102219 A | 1/2008 |
| CN | 101119188 A | 2/2008 |
| CN | 102142931 A | 8/2011 |
| CN | 102185718 A | 9/2011 |
| CN | 102694679 A | 9/2012 |
| CN | 102752147 A | 10/2012 |
| CN | 102867784 A | 1/2013 |
| CN | 102882704 A | 1/2013 |
| CN | 102882887 A | 1/2013 |
| CN | 102984055 A | 3/2013 |
| CN | 103354567 A | 10/2013 |
| WO | 0190843 A2 | 11/2001 |

\* cited by examiner

METHOD FOR UPGRADING VERSION OF NETWORK DEVICE AND NETWORK DEVICE

This application is a continuation of International Application No. PCT/CN2013/087116, filed on Nov. 14, 2013, which is hereby incorporated by reference in its entirety.

TECHNICAL FIELD

The present invention relates to the field of communications, and in particular, to a method for upgrading a version of a network device and a network device.

BACKGROUND

A network device has complex hardware and software, and there is a large quantity of demands for version replacement or upgrade. Because a service interruption time caused by version replacement or upgrade is also counted in a Mean Time To Recovery (MTTR) of the device, how to reduce the service interruption time during version upgrade is a problem that needs to be resolved by each equipment vendor. In-Service Software Upgrade (ISSU) and zero packet loss are goals constantly pursued by operators and equipment vendors.

During a Layer 2 packet forwarding process, packet forwarding is implemented on the basis of matching with a Media Access Control (MAC) address entry. When no matching MAC address entry is found, a packet is sent in a broadcast manner, and MAC address learning is performed. In an existing ISSU processing process, a MAC address is basically processed in the following manner:

During a period of switching from an earlier version to a new version in the ISSU, a MAC address entry of the earlier version is cleared, and packet forwarding in a broadcast manner is triggered. During a process of forwarding in a broadcast manner, in the new version, MAC address re-learning is performed, and a MAC address entry is generated; then packet forwarding is performed by using the generated MAC address entry.

In the foregoing ISSU version upgrade method, the inventor finds that during a period of switching from an earlier version to a new version, a MAC address table needs to be regenerated, which may cause that packets whose matching MAC address entries cannot be found are forwarded in a broadcast manner within this period. Therefore, a large quantity of broadcast packets are generated, and forwarding of the large quantity of broadcast packets may occupy excessive network bandwidth and cause network congestion.

SUMMARY

Embodiments of the present invention relate to the field of communications, and provide a method for upgrading a version of a network device and a network device, which are used to resolve a technical problem that a large quantity of broadcast packets need to be sent in an existing version upgrade method, leading to occupation of excessive network bandwidth and causing network congestion.

To achieve the foregoing objective, the following technical solutions are used in the embodiments.

According to a first aspect, a method for upgrading a version of a network device is provided. The method includes configuring a forwarding plane of the network device to be a first forwarding plane and a second forwarding plane, where the first forwarding plane runs a first version, the second forwarding plane runs a second version, and before version upgrade of the network device, the first forwarding plane is used for packet forwarding of the network device. The method also includes performing, in the first forwarding plane, sampling on forwarded packets by using a preset sampling ratio, to obtain a sample packet, and copying the sample packet to the second forwarding plane. The method also includes forwarding the sample packet in a broadcast manner in the second forwarding plane, to learn a MAC address, and generating a MAC address entry according to the learned MAC address. When a quantity of MAC addresses learned by the second forwarding plane reaches a preset threshold, the method includes performing upgrade so that the second forwarding plane is used for packet forwarding of the network device, where the preset threshold is a nonzero positive integer.

With reference to the first aspect, in a first possible implementation manner of the first aspect, after the performing upgrade so that the second forwarding plane is used for packet forwarding of the network device, the method further includes: in the second forwarding plane, for a packet whose matching MAC address entry is found, forwarding the packet in a unicast manner according to the found matching MAC address entry; and forwarding, in a broadcast manner, a packet whose matching MAC address entry is not found.

With reference to the first aspect or the first possible implementation manner of the first aspect, in a second possible implementation manner of the first aspect, before the performing, in the first forwarding plane, sampling on forwarded packets by using a preset sampling ratio, to obtain a sample packet, and copying the sample packet to the second forwarding plane, the method further includes: sending a Layer 2 forwarding entry generated by a control plane of the network device to the second forwarding plane.

With reference to the first aspect or either of the foregoing possible implementation manners of the first aspect, in a third possible implementation manner of the first aspect, the preset threshold meets the following condition: bandwidth occupied by broadcast packets that are forwarded without using MAC addresses in the preset threshold range does not exceed system bandwidth of the network device.

According to a second aspect, a network device is provided. The network device includes a configuration unit, configured to configure a forwarding plane of the network device to be a first forwarding plane and a second forwarding plane, where the first forwarding plane runs a first version, the second forwarding plane runs a second version, and before version upgrade of the network device, the first forwarding plane is used for packet forwarding of the network device. The network device also includes a sampling unit, configured to perform, in the first forwarding plane that is configured by the configuration unit, sampling on forwarded packets by using a preset sampling ratio, to obtain a sample packet, and copy the sample packet to the second forwarding plane. The network device also includes a generation unit, configured to forward the sample packet in a broadcast manner in the second forwarding plane that is configured by the configuration unit, to learn a MAC address, and generate a MAC address entry according to the learned MAC address. The network device also includes an upgrade unit, configured to: when a quantity of MAC addresses learned by the second forwarding plane reaches a preset threshold, perform upgrade so that the second forwarding plane is used for packet forwarding of the network device, where the preset threshold is a nonzero positive integer.

With reference to the second aspect, in a first possible implementation manner of the second aspect, the network device further includes a forwarding unit. The forwarding unit is configured to: after the upgrade unit performs upgrade so that the second forwarding plane is used for packet forwarding of the network device, in the second forwarding plane, for a packet whose matching MAC address entry is found, forward the packet in a unicast manner according to the found matching MAC address entry, and forward, in a broadcast manner, a packet whose matching MAC address entry is not found.

With reference to the second aspect or the first possible implementation of the second aspect, in a second possible implementation manner of the second aspect, the network device further includes a receiving unit. The receiving unit is configured to: before sampling is performed on forwarded packets in the first forwarding plane by using the preset sampling ratio, to obtain the sample packet, and the sample packet is copied to the second forwarding plane, send a Layer 2 forwarding entry generated by a control plane of the network device to the second forwarding plane.

With reference to the second aspect or either of the foregoing possible implementation manners of the second aspect, the preset threshold meets the following condition: bandwidth occupied by broadcast packets that are forwarded without using MAC addresses in the preset threshold range does not exceed system bandwidth of the network device.

According to a third aspect, a network device is provided, where the network device can perform packet forwarding, and the network device includes a processor, a transmitter, a memory and a bus. The processor, the transmitter and the memory are connected by using the bus; the memory is configured to store data processed by the processor. The processor is configured to configure a forwarding plane of the network device to be a first forwarding plane and a second forwarding plane, where the first forwarding plane runs a first version, the second forwarding plane runs a second version, and before version upgrade of the network device, the first forwarding plane is used for packet forwarding of the network device. The processor is further configured to perform, in the first forwarding plane, sampling on forwarded packets by using a preset sampling ratio, to obtain a sample packet, and copy the sample packet to the second forwarding plane. The processor is further configured to forward, by using the transmitter, the sample packet in a broadcast manner in the second forwarding plane, to learn a MAC address, and generate a MAC address entry according to the learned MAC address. The processor is further configured to: when a quantity of MAC addresses learned by the second forwarding plane reaches a preset threshold, perform upgrade so that the second forwarding plane is used for packet forwarding of the network device, where the preset threshold is a nonzero positive integer.

With reference to the third aspect, in a first possible implementation manner of the third aspect, the processor is further configured to: after performing upgrade so that the second forwarding plane is used for packet forwarding of the network device, in the second forwarding plane, for a packet whose matching MAC address entry is found, forward the packet in a unicast manner according to the found matching MAC address entry, and forward, in a broadcast manner, a packet whose matching MAC address entry is not found.

With reference to the third aspect or the first possible implementation manner of the third aspect, in a second possible implementation manner of the third aspect, the processor is further configured to: before performing, in the first forwarding plane, sampling on the forwarded packets by using the preset sampling ratio, to obtain the sample packet, and copying the sample packet to the second forwarding plane, send a Layer 2 forwarding entry generated by a control plane to the second forwarding plane.

With reference to the third aspect or either of the foregoing possible implementation manners of the third aspect, in a third possible implementation manner of the third aspect, the preset threshold meets the following condition: bandwidth occupied by broadcast packets that are forwarded without using MAC addresses in the preset threshold range does not exceed system bandwidth of the network device.

According to the method for upgrading a version of a network device and the network device, a forwarding plane of the network device is configured to be a first forwarding plane and a second forwarding plane, where the first forwarding plane runs a first version, the second forwarding plane runs a second version, and before version upgrade of the network device, the first forwarding plane is used for packet forwarding of the network device; sampling is performed on forwarded packets in the first forwarding plane by using a preset sampling ratio, to obtain a sample packet, and the sample packet is copied to the second forwarding plane; the second forwarding plane forwards the sample packet in a broadcast manner, to learn a MAC address, and a MAC address entry is generated according to the learned MAC address; and when a quantity of MAC addresses learned by the second forwarding plane reaches a preset threshold, upgrade is performed so that the second forwarding plane is used for packet forwarding of the network device. Because the second forwarding plane has learned in advance, by forwarding sample traffic in a broadcast manner, MAC addresses whose quantity is equal to the preset threshold, generation of a large quantity of broadcast packets can be effectively avoided during a version upgrade process, which can help reduce network bandwidth that is excessively occupied, and avoid network congestion.

BRIEF DESCRIPTION OF THE DRAWINGS

For a more complete understanding of the present invention, and the advantages thereof, reference is now made to the following descriptions taken in conjunction with the accompanying drawings, in which.

To describe the technical solutions in the embodiments of the present invention more clearly, the following briefly introduces the accompanying drawings required for describing the embodiments and the prior art.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
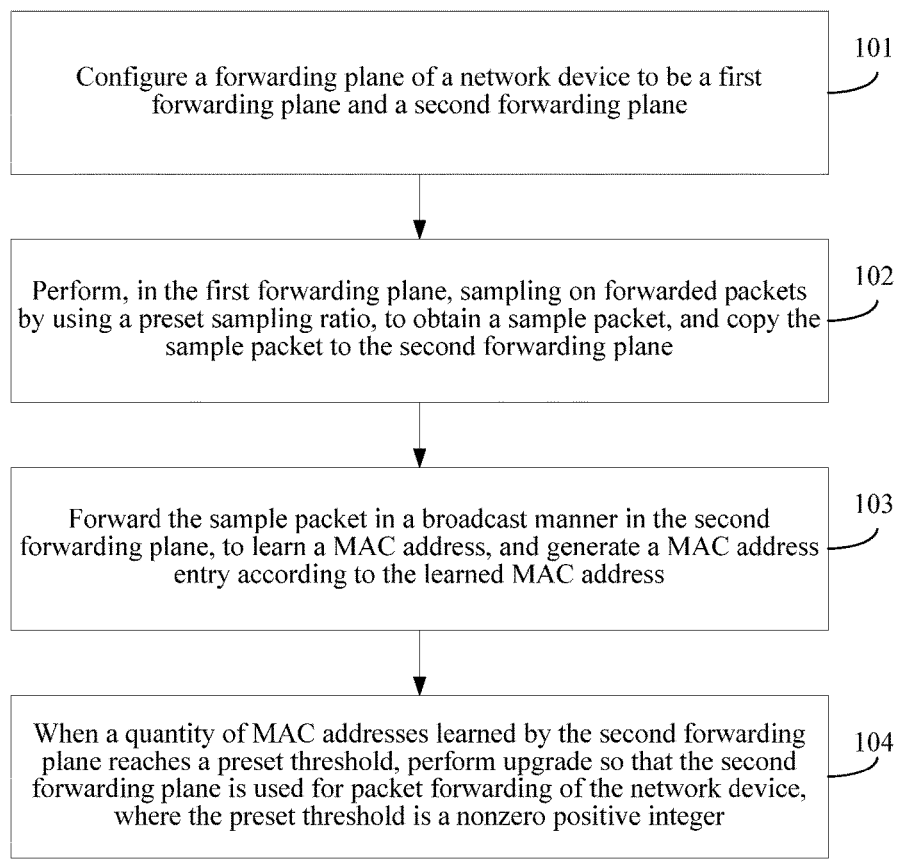
FIG. 1 is a flowchart of a method for upgrading a version of a network device according to an embodiment.

An embodiment provides a method for upgrading a version of a network device. Referring to FIG. 1, the method includes the following steps.

101: Configure a forwarding plane of the network device to be a first forwarding plane and a second forwarding plane.

Specifically, the first forwarding plane runs a first version, the second forwarding plane runs a second version, and before version upgrade of the network device, the first forwarding plane is used for packet forwarding of the network device.

The second version may be an upgraded version based on the first version, or the second version may be a brand new version irrelevant to the first version. Because the first forwarding plane already has MAC addresses that are on a communications network, and these MAC addresses are stored in the first forwarding plane according to a format of the first version, the first forwarding plane can forward packets in a unicast manner by using these MAC addresses.

102: Perform, in the first forwarding plane, sampling on forwarded packets by using a preset sampling ratio, to obtain a sample packet, and copy the sample packet to the second forwarding plane.

103: Forward the sample packet in a broadcast manner in the second forwarding plane, to learn a MAC address, and generate a MAC address entry according to the learned MAC address.

For example, the sampling ratio may be 100:1, that is, one packet is sampled from 100 forwarded packets and is used as a sample packet. The second forwarding plane needs to forward the sample packet in a broadcast manner, to learn the MAC address. Therefore, a quantity of sample packets that are sampled should be relatively small, so as to avoid generation of a large quantity of broadcast packets and consequent network congestion during a process of MAC address learning by the second forwarding plane.

Because the second version and the first version are two versions different from each other, the second version cannot use a MAC address in the format of the first version to forward packets in a unicast manner. Therefore, in the second version, MAC address re-learning needs to be performed. The second forwarding plane learns the MAC address by forwarding the sample packet in a broadcast manner. During this process, packet forwarding according to MAC addresses is implemented in the first forwarding plane, ensuring that the second forwarding plane has sufficient time to learn the MAC address, which is applicable to large-scale version upgrade.

104: When a quantity of MAC addresses learned by the second forwarding plane reaches a preset threshold, perform upgrade so that the second forwarding plane is used for packet forwarding of the network device, where the preset threshold is a nonzero positive integer.

The preset threshold refers to a predetermined quantity of MAC addresses that need to be learned by the second forwarding plane, or may be a percentage of a predetermined quantity of MAC addresses that need to be learned by the second forwarding plane in a total quantity of MAC addresses, for example, 80%.

The preset threshold meets that: bandwidth occupied by broadcast packets that are forwarded without using MAC addresses in the preset threshold range does not exceed system bandwidth of the network device. In this way, in the second forwarding plane, most packets are forwarded in a unicast manner by using learned MAC addresses, and remaining packets are forwarded in a broadcast manner. Because a quantity of the remaining packets is relatively small, bandwidth occupied by broadcast packets that need to be forwarded does not exceed system bandwidth of the network device, thereby avoiding network congestion.

In the foregoing embodiment, a forwarding plane of a network device is configured to be a first forwarding plane and a second forwarding plane, where the first forwarding plane runs a first version, the second forwarding plane runs a second version, and before version upgrade of the network device, the first forwarding plane is used for packet forwarding of the network device; sampling is performed on forwarded packets in the first forwarding packet by using a preset sampling ratio, to obtain a sample packet, and the sample packet is copied to the second forwarding plane; the second forwarding plane forwards the sample packet in a broadcast manner, to learn a MAC address, and a MAC address entry is generated according to the learned MAC address; and when a quantity of MAC addresses learned by the second forwarding plane reaches a preset threshold, upgrade is performed so that the second forwarding plane is used for packet forwarding of the network device. Because the second forwarding plane has learned in advance, by forwarding sample traffic in a broadcast manner, MAC addresses whose quantity is equal to a preset threshold, generation of a large quantity of broadcast packets can be effectively avoided during a version upgrade process, which can help reduce network bandwidth that is excessively occupied, and avoid network congestion.

Figure 2:
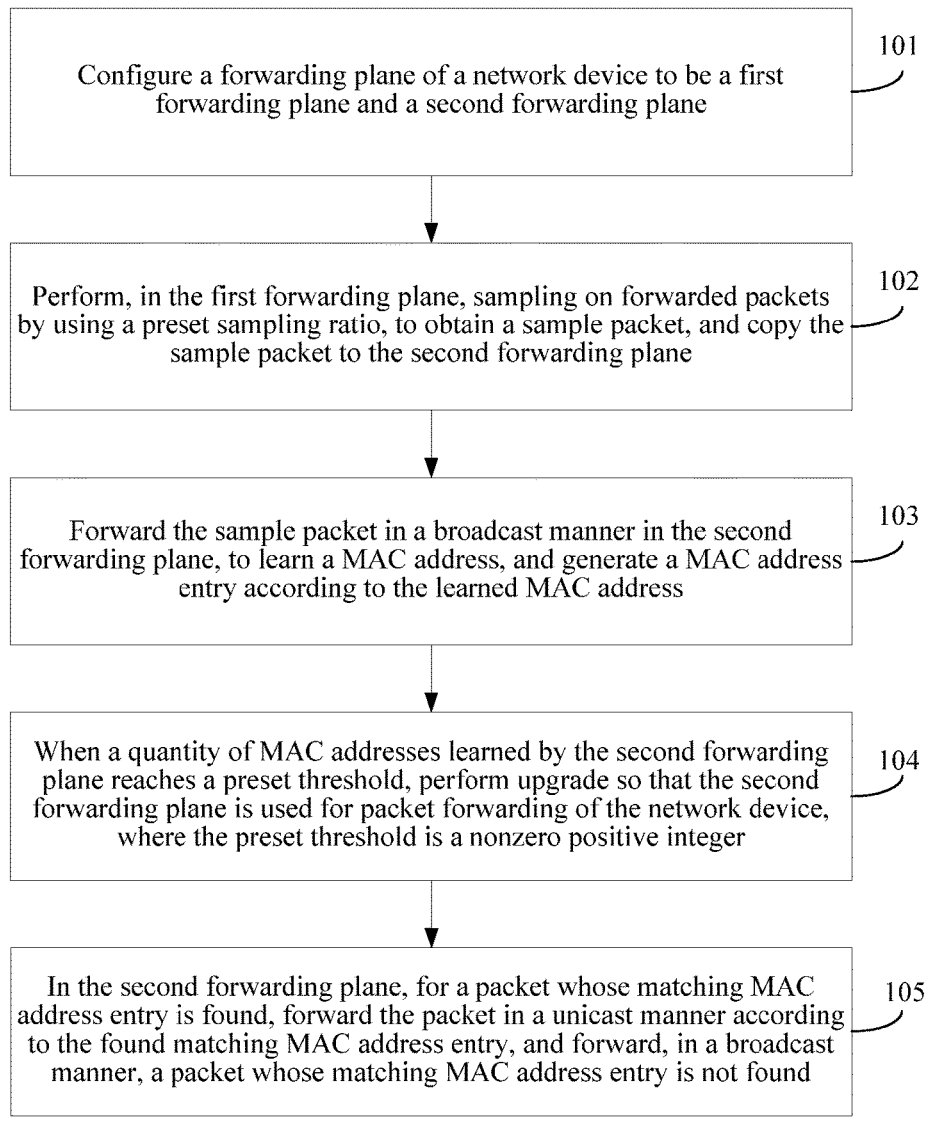
FIG. 2 is a flowchart of a method for upgrading a version of a network device according to an embodiment.

Optionally, on the basis of the embodiment corresponding to FIG. 1, referring to FIG. 2, after step 104, the method further includes the following steps.

105: For a packet whose matching MAC address entry is found, the second forwarding plane forwards the packet in a unicast manner according to the found matching MAC address entry, and forwards, in a broadcast manner, a packet whose matching MAC address entry is not found.

In the second forwarding plane, for most packets, matching MAC address entries can be found, and the packets are forwarded in a unicast manner, while a packet whose matching MAC address entry is not found is forwarded in a broadcast manner. Because a quantity of packets whose matching MAC address entries are not found is relatively small, bandwidth occupied by broadcast packets that need to be forwarded does not exceed system bandwidth of the network device, thereby avoiding network congestion.

In the foregoing embodiment, after upgrade is performed so that the second forwarding plane is used for packet forwarding of the network device, by forwarding, in a unicast manner, a packet whose matching MAC address entry can be found, and forwarding, in a broadcast manner, a packet whose matching MAC address entry is not found, the second forwarding plane can learn, without causing network congestion, MAC addresses that are on the communications network and have not been learned, thereby supplementing a MAC address table with entries.

Further, based on the foregoing embodiment, before step 102, the method further includes the following steps: sending a Layer 2 forwarding entry generated by a control plane to the second forwarding plane, so as to perform step 102 to step 104 according to the Layer 2 forwarding entry, to implement forwarding of the sample packet, and after upgrade is performed so that the second forwarding plane is used for packet forwarding of the network device, performing forwarding of all packets in the second forwarding plane.

Figure 3:
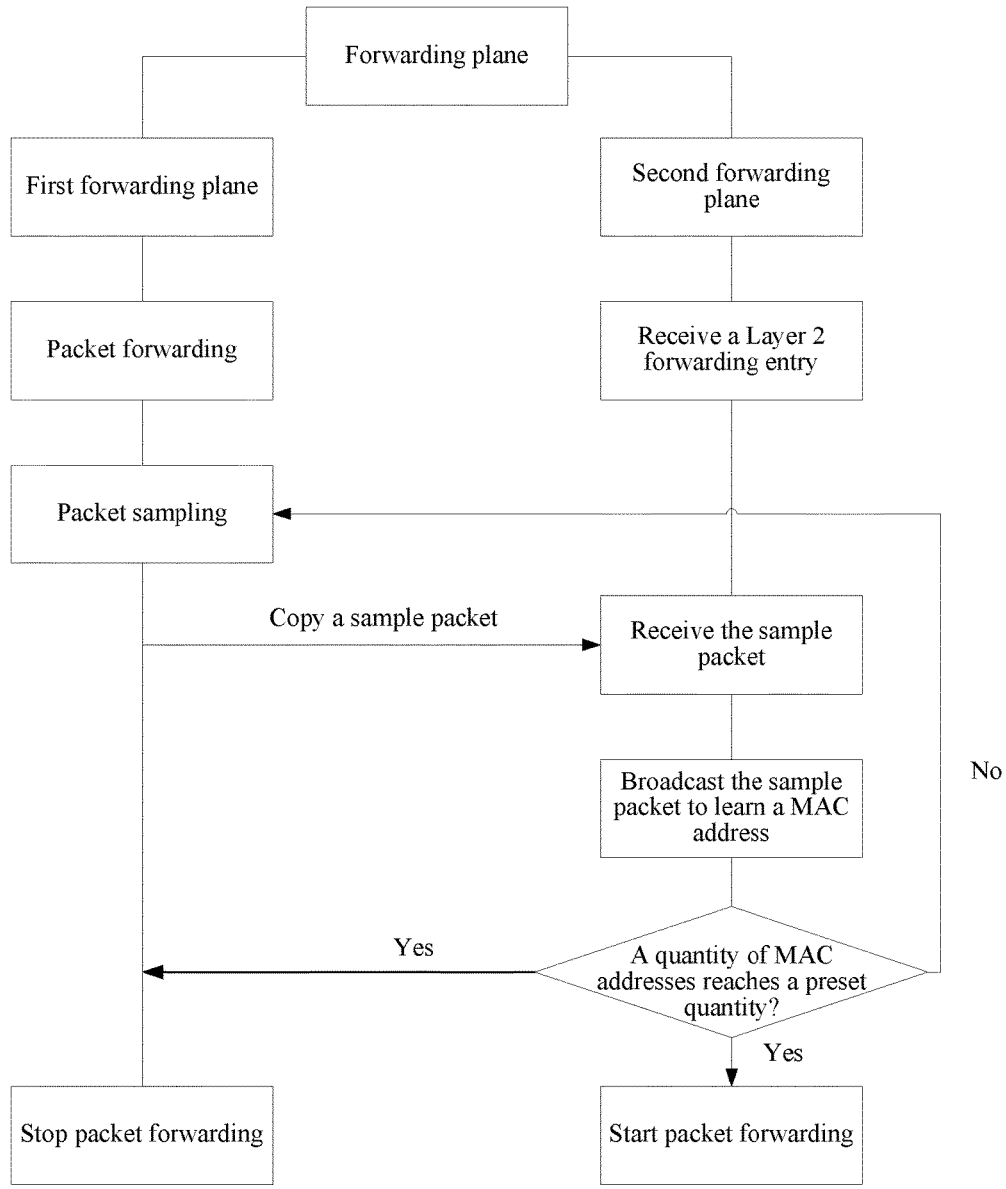
FIG. 3 is a schematic diagram of a method for upgrading a version of a network device according to an embodiment.

Specifically, referring to FIG. 3, the method for upgrading a version of a network device provided by the foregoing embodiment is specifically described as follows: First, a forwarding plane of the network device is divided into a first forwarding plane and a second forwarding plane. The first forwarding plane runs a first version, and the second forwarding plane runs a second version. At this time, only the first forwarding plane performs packet forwarding, while the second forwarding plane does not perform packet forwarding.

When the first forwarding plane performs packet forwarding, the second forwarding plane performs configuration recovery and receives a Layer 2 forwarding entry that is sent by a control plane of the network device.

When the second forwarding plane completes the configuration recovery and receives the Layer 2 forwarding entry that is sent by the control plane of the network device, sampling is performed on forwarded packets in the first forwarding plane by using a preset sampling ratio, to obtain a sample packet, and the packet is copied to the second forwarding plane.

The second forwarding plane forwards the sample packet in a broadcast manner, to learn a MAC address, and generates a MAC address entry according to the learned MAC address. Because generation of a large quantity of broadcast packets needs to be avoided during a process of MAC address learning by the second forwarding plane, a quantity of sample packets should be relatively small. For example, the sampling ratio may be 100:1, that is, one packet is sampled from 100 packets forwarded by the first forwarding plane, and is used as a sample packet. The second forwarding plane learns the MAC address by using the sample packet. During this process, packet forwarding according to MAC addresses is performed in the first forwarding plane, ensuring that the second forwarding plane has sufficient time to learn the MAC address, which is applicable to large-scale version upgrade. The second forwarding plane keeps learning MAC addresses by using sample packets obtained by means of sampling in the first forwarding plane, until a quantity of MAC addresses learned by the second forwarding plane is greater than or equal to a preset threshold. Then, the first forwarding plane stops packet forwarding and packet sampling, while the network device performs upgrade so that the second forwarding plane performs packet forwarding.

Specifically, the performing upgrade so that the second forwarding plane performs packet forwarding includes: in the second forwarding plane, for a packet whose matching MAC address entry is found, forwarding the packet in a unicast manner according to the found matching MAC address, and forwarding, in a broadcast manner, a packet whose matching MAC address entry is not found. By forwarding, in a unicast manner, a packet whose matching MAC address entry can be found, and forwarding, in a broadcast manner, a packet whose matching MAC address entry is not found, the second forwarding plane can learn, without causing network congestion, MAC addresses that are on the communications network and have not been learned, thereby supplementing a MAC address table with entries.

In the foregoing method, a forwarding plane of a network device is configured to be a first forwarding plane and a second forwarding plane, where the first forwarding plane runs a first version, the second forwarding plane runs a second version, and before version upgrade of the network device, the first forwarding plane is used for packet forwarding of the network device; sampling is performed on forwarded packets in the first forwarding plane by using a preset sampling ratio, to obtain a sample packet, and the sample packet is copied to the second forwarding plane; the second forwarding plane forwards the sample packet in a broadcast manner, to learn a MAC address, and a MAC address entry is generated according to the learned MAC address; and when a quantity of MAC addresses learned by the second forwarding plane reaches a preset threshold, upgrade is performed so that the second forwarding plane is used for packet forwarding of the network device. Because the second forwarding plane has learned in advance, by forwarding sample traffic in a broadcast manner, MAC addresses whose quantity is equal to a preset threshold, generation of a large quantity of broadcast packets can be effectively avoided during a version upgrade process, which can help reduce network bandwidth that is excessively occupied, and avoid network congestion.

Figure 4:
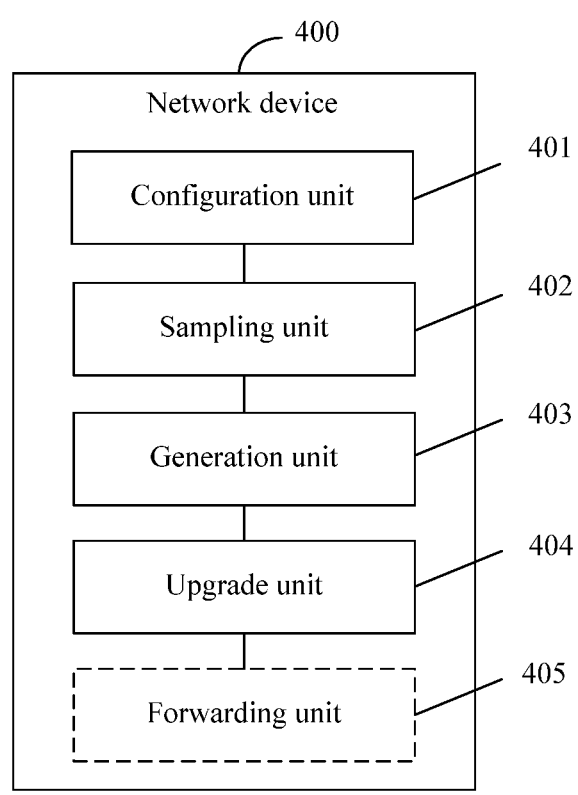
FIG. 4 is a schematic structural diagram of a network device according to an embodiment.

An embodiment provides a network device 400. configured to implement the foregoing method. Referring to FIG. 4, the network device 400 includes: a configuration unit 401, configured to configure a forwarding plane of the network device 400 to be a first forwarding plane and a second forwarding plane, where the first forwarding plane runs a first version, the second forwarding plane runs a second version, and before version upgrade of the network device 400, the first forwarding plane is used for packet forwarding of the network device 400. The second version may be an upgraded version based on the first version, or the second version may be a brand new version irrelevant to the first version. Because the first forwarding plane already has MAC addresses that are on a communications network, and these MAC addresses are stored in the first forwarding plane according to a format of the first version, the first forwarding plane can forward packets in a unicast manner by using these MAC addresses. Also included is a sampling unit 402, configured to perform, in the first forwarding plane that is configured by the configuration unit 401, sampling on forwarded packets by using a preset sampling ratio, to obtain a sample packet, and copy the sample packet to the second forwarding plane. Also included is a generation unit 403, configured to forward the sample packet in a broadcast manner in the second forwarding plane that is configured by the configuration unit 401, to learn a MAC address, and generate a MAC address entry according to the learned MAC address. The second forwarding plane learns the MAC address by broadcasting the sample packet, and during this process, packet forwarding according to MAC addresses is performed by the first forwarding plane, ensuring that the second forwarding plane has sufficient time to learn the MAC address, which is applicable to large-scale version upgrade. Also included is an upgrade unit 404, configured to: when a quantity of MAC addresses learned by the second forwarding plane reaches a preset threshold, perform upgrade so that the second forwarding plane is used for packet forwarding of the network device 400, where the preset threshold is a nonzero positive integer.

The preset threshold meets that: bandwidth occupied by broadcast packets that are forwarded without using MAC addresses in the preset threshold range does not exceed system bandwidth of the network device. In this way, in the second forwarding plane, most packets are forwarded in a unicast manner by using learned MAC addresses, and remaining packets are forwarded in a broadcast manner. Because a quantity of the remaining packets is relatively small, bandwidth occupied by broadcast packets that need to be forwarded does not exceed system bandwidth of the network device, thereby avoiding network congestion.

Further, the network device 400 further includes: a forwarding unit 405, configured to: after the upgrade unit 404 performs upgrade so that the second forwarding plane is used for packet forwarding of the network device 400, in the second forwarding plane, for a packet whose matching MAC address entry is found, forward the packet in a unicast manner according to the found matching MAC address entry, and forward, in a broadcast manner, a packet whose matching MAC address entry is not found.

After upgrade is performed so that the second forwarding plane is used for packet forwarding of the network device 400, by forwarding, in a unicast manner, a packet whose matching MAC address entry can be found, and forwarding, in a broadcast manner, a packet whose matching MAC address entry is not found, the second forwarding plane can learn, without causing network congestion, MAC addresses that are on the communications network and have not been learned, thereby supplementing a MAC address table with entries.

Figure 5:
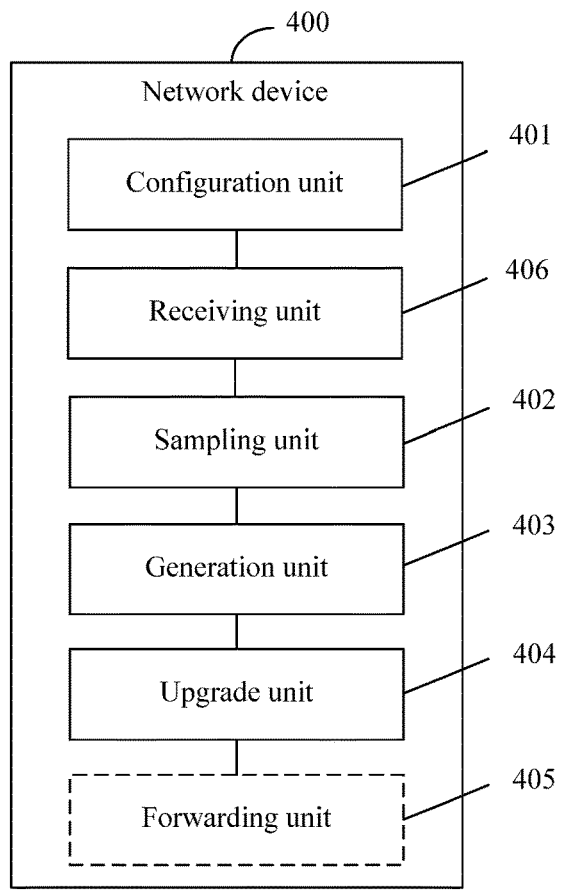
FIG. 5 is a schematic structural diagram of a network device according to an embodiment.

Optionally, referring to FIG. 5, the network device further includes: a receiving unit 406, configured to: before sampling is performed on the forwarded packets in the first forwarding plane by using the preset sampling ratio, to obtain the sample packet, and the sample packet is copied to the second forwarding plane, send a Layer 2 forwarding entry generated by a control plane to the second forwarding plane.

In the foregoing network device 400, a forwarding plane of the network device 400 is configured to be a first forwarding plane and a second forwarding plane, where the first forwarding plane runs a first version, the second forwarding plane runs a second version, and before version upgrade of the network device 400, the first forwarding plane is used for packet forwarding of the network device 400; sampling is performed on forwarded packets in the first forwarding plane by using a preset sampling ratio, to obtain a sample packet, and the sample packet is copied to the second forwarding plane; the second forwarding plane forwards the sample packet in a broadcast manner, to learn a MAC address, and a MAC address entry is generated according to the learned MAC address; and when a quantity of MAC addresses learned by the second forwarding plane reaches a preset threshold, upgrade is performed so that the second forwarding plane is used for packet forwarding of the network device. Because the second forwarding plane has learned in advance, by forwarding sample traffic in a broadcast manner, MAC addresses whose quantity is equal to a preset threshold, generation of a large quantity of broadcast packets can be effectively avoided during a version upgrade process, which can help reduce network bandwidth that is excessively occupied, and avoid network congestion.

Figure 6:
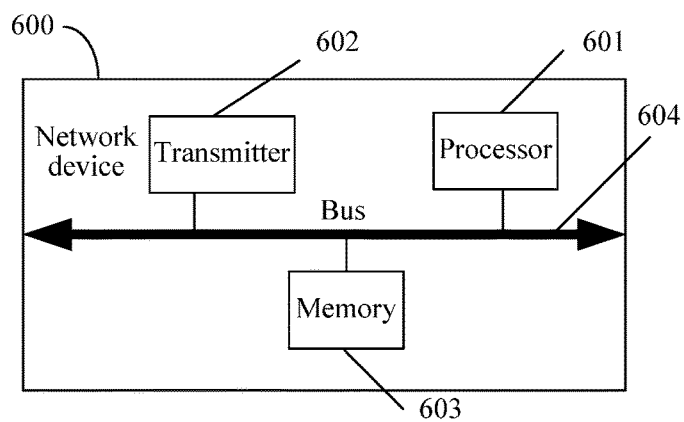
FIG. 6 is a schematic structural diagram of a network device according to an embodiment.

An embodiment provides a network device 600, configured to implement the foregoing method for upgrading a version of a network device. Referring to FIG. 6, the network device 600 includes: a processor 601, a transmitter 602, a memory 603 and a bus 604. The processor 601, the transmitter 602 and the memory 603 are connected by using the bus 604. The memory 603 is configured to store data that is processed by the processor.

The bus 604 may be an ISA (Industry Standard Architecture, industry standard architecture) bus, a PCI (Peripheral Component, Peripheral Component Interconnect) bus, or an EISA (Extended Industry Standard Architecture, extended industry standard architecture) bus, or the like. The bus 604 may be classified into address bus, data bus, control bus, and the like. For ease of representation, the bus is represented by only one thick line in FIG. 6, but it does not indicate that there is only one bus or only one type of bus.

The memory 603 is configured to store executable program code, where the program code includes a computer operating instruction. The memory 603 may include a high-speed RAM memory, and may further include a non-volatile memory (non-volatile memory), for example, at least one magnetic disk storage.

The processor 601 may be a central processing unit (CPU for short), or an application-specific integrated circuit (ASIC for short), or one or more integrated circuits that are configured to implement the embodiments.

The processor 601 is configured to configure a forwarding plane of the network device 600 to be a first forwarding plane and a second forwarding plane, where the first forwarding plane runs a first version, the second forwarding plane runs a second version, and before version upgrade of the network device, the first forwarding plane is used for packet forwarding of the network device.

The second version may be an upgraded version based on the first version, or the second version may be a brand new version irrelevant to the first version. Because the first forwarding plane already has MAC addresses that are on a communications network, and these MAC addresses are stored in the first forwarding plane according to a format of the first version, the first forwarding plane can forward packets in a unicast manner by using these MAC addresses.

The processor 601 is further configured to perform, in the first forwarding plane, sampling on forwarded packets by using a preset sampling ratio, to obtain a sample packet, and copy the sample packet to the second forwarding plane.

The processor 601 is further configured to forward, by using the transmitter, the sample packet in a broadcast manner in the second forwarding plane, to learn a MAC address, and generate a MAC address entry according to the learned MAC address.

The second forwarding plane learns the MAC address by broadcasting the sample packet, and during this process, packet forwarding according to MAC addresses is performed by the first forwarding plane, ensuring that the second forwarding plane has sufficient time to learn the MAC address, which is applicable to large-scale version upgrade.

The processor 601 is further configured to: when a quantity of MAC addresses learned by the second forwarding plane reaches a preset threshold, perform upgrade so that the second forwarding plane is used for packet forwarding of the network device, where the preset threshold is a nonzero positive integer.

The preset threshold meets that: bandwidth occupied by broadcast packets that are forwarded without using MAC addresses in the preset threshold range does not exceed system bandwidth of the network device. In this way, in the second forwarding plane, most packets are forwarded in a unicast manner by using learned MAC addresses, and remaining packets are forwarded in a broadcast manner. Because a quantity of the remaining packets is relatively small, bandwidth occupied by broadcast packets that need to be forwarded does not exceed system bandwidth of the network device, thereby avoiding network congestion.

Optionally, the processor 601 is further configured to: after upgrade is performed so that the second forwarding plane is used for packet forwarding of the network device, in the second forwarding plane, for a packet whose matching MAC address entry is found, forward the packet in a unicast manner according to the found matching MAC address entry, and forward, in a broadcast manner, a packet whose matching MAC address entry is not found.

After upgrade is performed so that the second forwarding plane is used for packet forwarding of the network device, by forwarding, in a unicast manner, a packet whose matching MAC address entry can be found, and forwarding, in a broadcast manner, a packet whose matching MAC address entry is not found, the second forwarding plane can learn, without causing network congestion, MAC addresses that are on the communications network and have not been learned, thereby supplementing a MAC address table with entries.

Optionally, the processor 601 is further configured to: before performing sampling on the forwarded packets in the first forwarding plane by using the preset sampling ratio, to obtain the sample packet, and copying the sample packet to the second forwarding plane, send a Layer 2 forwarding entry generated by a control plane to the second forwarding plane.

In the foregoing network device 600, a forwarding plane of the network device 600 is configured to be a first forwarding plane and a second forwarding plane, where the first forwarding plane runs a first version, the second forwarding plane runs a second version, and before version upgrade of the network device 600, the first forwarding plane is used for packet forwarding of the network device 600; sampling is performed on forwarded packets in the first forwarding plane by using a preset sampling ratio, to obtain a sample packet, and the sample packet is copied to the second forwarding plane; the second forwarding plane forwards the sample packet in a broadcast manner, to learn a MAC address, and a MAC address entry is generated according to the learned MAC address; and when a quantity of MAC addresses learned by the second forwarding plane reaches a preset threshold, upgrade is performed so that the second forwarding plane is used for packet forwarding of the network device. Because the second forwarding plane has learned in advance, by forwarding sample traffic in a broadcast manner, MAC addresses whose quantity is equal to a preset threshold, generation of a large quantity of broadcast packets can be effectively avoided during a version upgrade process, which can help reduce network bandwidth that is excessively occupied, and avoid network congestion.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. For example, but not limited to: the computer readable medium may include RAM (Random Access Memory), ROM (Read Only Memory), EEPROM (Electrically Erasable Programmable Read Only Memory), CD-ROM (Compact Disc Read Only Memory, read only optical disc), another optical disc storage or magnetic disk storage medium, or another magnetic storage device, or any other medium that can be used for carrying or storage of expected program code in a form of instruction or data structure and can be accessed by a computer. In addition, any connection may be appropriately defined as a computer-readable medium. For example, if software is transmitted from a website, a server or another remote source by using a coaxial cable, an optical fiber/cable, a twisted pair, a DSL (Digital Subscriber Line) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention includes a CD (Compact Disc), a laser disc, an optical disc, a DVD (Digital Versatile Disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for upgrading a version of a network device, comprising:

configuring, by the network device, a forwarding plane of the network device to be a first forwarding plane and a second forwarding plane, wherein the first forwarding plane runs a first version, the second forwarding plane runs a second version, and before version upgrade of the network device, the first forwarding plane is used for packet forwarding of the network device;

performing, by the network device in the first forwarding plane, sampling on forwarded packets using a preset sampling ratio, to obtain a sample packet, and copying the sample packet to the second forwarding plane;

forwarding, by the network device, the sample packet in a broadcast manner in the second forwarding plane, to learn a Media Access Control (MAC) address, and generating a MAC address entry according to the learned MAC address; and in response to a quantity of MAC addresses learned by the second forwarding plane reaching a preset threshold, performing an upgrade so that the second forwarding plane is used for packet forwarding of the network device, wherein the preset threshold is a nonzero positive integer.

2. The method according to claim 1, wherein after the performing the upgrade so that the second forwarding plane is used for packet forwarding of the network device, the method further comprises:

in the second forwarding plane, for a packet whose matching MAC address entry is found, forwarding the packet in a unicast manner according to the found matching MAC address entry; and forwarding, in a broadcast manner, a packet whose matching MAC address entry is not found.

3. The method according to claim 1, wherein before performing sampling on forwarded packets using the preset sampling ratio, and copying the sample packet to the second forwarding plane, the method further comprises:
sending a Layer 2 forwarding entry generated by a control plane of the network device to the second forwarding plane.

4. The method according to claim 1, wherein the preset threshold meets the following condition:
a bandwidth occupied by broadcast packets that are forwarded without using MAC addresses in the preset threshold range does not exceed a system bandwidth of the network device.

5. The method according to claim 1, wherein performing the upgrade so that the second forwarding plane is used for packet forwarding of the network device comprises:
in the second forwarding plane, for a packet whose matching MAC address entry is found, forwarding the packet in a unicast manner according to the found matching MAC address, and forwarding, in a broadcast manner, a packet whose matching MAC address entry is not found.

6. A network device, comprising:
a configuration unit, configured to configure a forwarding plane of the network device to be a first forwarding plane and a second forwarding plane, wherein the first forwarding plane runs a first version, the second forwarding plane runs a second version, and before version upgrade of the network device, the first forwarding plane is used for packet forwarding of the network device;
a sampling unit, configured to perform, in the first forwarding plane that is configured by the configuration unit, sampling on forwarded packets by using a preset sampling ratio, to obtain a sample packet, and copy the sample packet to the second forwarding plane;
a generation unit, configured to forward the sample packet in a broadcast manner in the second forwarding plane that is configured by the configuration unit, to learn a media access control (MAC) address, and generate a MAC address entry according to the learned MAC address; and
an upgrade unit, configured to, in response to a quantity of MAC addresses learned by the second forwarding plane reaching a preset threshold, perform an upgrade so that the second forwarding plane is used for packet forwarding of the network device, wherein the preset threshold is a nonzero positive integer.

7. The network device according to claim 6, further comprising a forwarding unit, wherein the forwarding unit is configured to:
after the upgrade unit performs the upgrade so that the second forwarding plane is used for packet forwarding of the network device, in the second forwarding plane, for a packet whose matching MAC address entry is found, forward the packet in a unicast manner according to the found matching MAC address entry; and forward, in a broadcast manner, a packet whose matching MAC address entry is not found.

8. The network device according to claim 6, wherein the network device further comprises a receiving unit, wherein the receiving unit is configured to:
before sampling is performed on the forwarded packets in the first forwarding plane that is configured by the configuration unit by using the preset sampling ratio, to obtain the sample packet, and the sample packet is copied to the second forwarding plane, send a Layer 2 forwarding entry generated by a control plane of the network device to the second forwarding plane.

9. The network device according to claim 6, wherein the preset threshold meets the following condition:
a bandwidth occupied by broadcast packets that are forwarded without using MAC addresses in the preset threshold range does not exceed a system bandwidth of the network device.

10. The network device according to claim 6, wherein performing the upgrade so that the second forwarding plane is used for packet forwarding of the network device comprises:
in the second forwarding plane, for a packet whose matching MAC address entry is found, forwarding the packet in a unicast manner according to the found matching MAC address, and forwarding, in a broadcast manner, a packet whose matching MAC address entry is not found.

11. A network device, comprising a processor, a transmitter, a memory and a bus, wherein:
the processor, the transmitter and the memory are connected by using the bus; the memory is configured to store data processed by the processor; and
the processor is configured to:
configure a forwarding plane of the network device to be a first forwarding plane and a second forwarding plane, wherein the first forwarding plane runs a first version, the second forwarding plane runs a second version, and before version upgrade of the network device, the first forwarding plane is used for packet forwarding of the network device;
perform, in the first forwarding plane, sampling on forwarded packets using a preset sampling ratio, to obtain a sample packet, and copy the sample packet to the second forwarding plane;
forward, by using the transmitter, the sample packet in a broadcast manner in the second forwarding plane, to learn a media access control (MAC) address, and generate a MAC address entry according to the learned MAC address; and
in response to a quantity of MAC addresses learned by the second forwarding plane reaching a preset threshold, perform an upgrade so that the second forwarding plane is used for packet forwarding of the network device, wherein the preset threshold is a nonzero positive integer.

12. The network device according to claim 11, wherein the processor is further configured to:
after performing the upgrade so that the second forwarding plane is used for packet forwarding of the network device, in the second forwarding plane, for a packet whose matching MAC address entry is found, forward the packet in a unicast manner according to the found matching MAC address entry; and forward, in a broadcast manner, a packet whose matching MAC address entry is not found.

13. The network device according to claim 11, wherein the processor is further configured to:
before performing, in the first forwarding plane, sampling on the forwarded packets using the preset sampling ratio, to obtain the sample packet, and copying the sample packet to the second forwarding plane, send a Layer 2 forwarding entry generated by a control plane to the second forwarding plane.

14. The network device according to claim 11, wherein the preset threshold meets the following condition:

a bandwidth occupied by broadcast packets that are forwarded without using MAC addresses in the preset threshold range does not exceed a system bandwidth of the network device.

15. The network device according to claim 11, wherein performing the upgrade so that the second forwarding plane is used for packet forwarding of the network device comprises:

in the second forwarding plane, for a packet whose matching MAC address entry is found, forwarding the packet in a unicast manner according to the found matching MAC address, and forwarding, in a broadcast manner, a packet whose matching MAC address entry is not found.

\* \* \* \* \*